United States Patent [19]
Watanabe et al.

[11] Patent Number: 5,329,603
[45] Date of Patent: Jul. 12, 1994

[54] STRAIN RELIEF BOOT FOR AN OPTICAL CONNECTOR PLUG

[75] Inventors: Tetsuaki Watanabe, Yokohama; Kouichiro Matsuno, Chigasaki; Yasuhiro Ando, Houya, all of Japan

[73] Assignees: Sumitomo Electric Industries, Ltd., Osaka; Sumiden High Precision Co., Ltd., Chigasaki; Nippon Telegraph and Telephone Corporation, Tokyo, all of Japan

[21] Appl. No.: 49,189

[22] Filed: Apr. 21, 1993

[30] Foreign Application Priority Data

Apr. 22, 1992 [JP] Japan ................. 4-102950

[51] Int. Cl.$^5$ ................. G02B 6/00; G02B 6/36
[52] U.S. Cl. ................. 385/86
[58] Field of Search ................. 385/85-89

[56] References Cited

U.S. PATENT DOCUMENTS 4,802,728  2/1989  Komatsu ................. 385/86 X
4,813,760  3/1989  Tanaka et al. ................. 385/86 X Primary Examiner—Akm E. Ullah
Attorney, Agent, or Firm—Cushman, Darby & Cushman

[57] ABSTRACT

A strain relief boot for an optical connector plug which can prevent the occurrence of acute bends of the connection between the optical connector plug and an optical fiber cable, whereby the deterioration of the transmission characteristic of the optical fiber cable can be prevented. The strain relief boot has a first tubular member of Nylon 6.6 having a Rockwell hardness of about 85 and a second tubular member of thermoplastic polyurethane having Rockwell hardness of about 45 connected coaxially with the first member. An outer diameter of the second member is gradually reduced away from the first member, and an end portion of the second member opposite to the first member is shaped in a cylindrical portion a thickness of which is substantially constant. Preferably, the cylindrical portion has a length of above 4.0 mm.

12 Claims, 11 Drawing Sheets

STRAIN RELIEF BOOT FOR AN OPTICAL CONNECTOR PLUG

BACKGROUND OF THE INVENTION

1. Field of the Invention

The present invention relates to an optical connector for coupling the conductor of an optical fiber cable to that of another optical fiber cable or to an optical waveguide or others of an optical device, more particularly, is concerned with means for suppressing increases of a transmission loss, which result from bends of the connection between the optical fiber cable and the optical connector plug.

2. Related Background Art

To couple the conductors of single mode type optical fiber cables, recently removable optical connectors are dominantly used. This trend is more conspicuous in internal optical wirings, and optical wiring to machines and instruments.

Such optical fibers generally require to achieve small coupling losses, easy removal, small sizes and lightness, mass-production at low costs, etc. The inventors of the present invention have made various studies on the improvement of the transmission characteristic of the optical fiber cables and have been confronted with the problem of transmission losses due to bends of the connections between optical connector plugs and the optical fiber cables.

That is, in the case that an optical connector plug is used in a horizontal arrangement, the optical fiber cable droops due to its own weight. And, when the optical fiber cable is downwardly pulled for maintenance and inspection, the optical fiber cable is caused to bend at an acute angle at the connection with the optical connector plug. This bend increases the transmission loss of the optical fiber. The inventors of the present invention noted this problem. They have made various experiments and analyzed points of the problem. The points of the problem will be explained below with reference to a drawing.

FIG. 1 is a sectional view of the conventionally used optical connector plug. This optical connector plug 100 includes a ferrule 102 to be connected to one end of an optical fiber conductor 104 of an optical fiber cable 106. This ferrule 102 is housed axially slidably in a plug body 108. When the plug body 108 is engaged in an alignment member 110, the ferrule 102 of the optical connector plug 100 is brought into alignment with a ferrule 112 of another optical connector plug 114, and the conductors of the optical fiber cables are coupled with each other. A stop ring 116 for prohibiting the ferrule 102 from coming off the plug body 108 is inserted and secured in the rear end portion of the plug body 108 (the right end in FIG. 1). A cable retention ring 118 is connected with the end portion of the stop ring 116.

The optical fiber cable 106 is extended outside through the central hollows 120 of the stop ring 116 and the cable retention ring 118. The rear end portion of the cable retention ring 118 has a reduced diameter and is covered with the jacket 122 of the optical fiber cable 106. The jacket 122 is fastened to the end portion of the cable retention ring 118 by a fastening ring 124 surrounding the jacket 122.

The cable retention ring 118, and a portion of the optical fiber extended out of the cable retention ring 118 are covered with a strain relief boot 126. The boot 126 is for the protection of the boundary 128 between the retention ring 118 and the optical fiber cable 106.

The strain relief boot 126 is conventionally made of silicone rubber or elastic plastics, and is formed in one piece. The section of the boot 126 is as shown in FIG. 1. Its forward portion 126a is as thin as about 0.55 mm, and the rearward portion 126b is formed thicker and is tapered to decrease its thickness toward the rear end portion. A difference in thickness between the forward portion 126a of the boot 126 and the rearward portion 126b thereof is because there is a difference between a maximum outer diameter of the fastening ring 124 and an outer diameter of the optical fiber cable 106, and the fastening ring 124 is formed of a harder metal which allows the forward portion 126a to be relatively thin.

However, the above-described conventional boot 126, which is soft, adversely allows the optical fiber cable 106 to the rearward portion 126b, which should function to rearwardly distribute a curvature of the optical fiber cable, to form a downward acute angle at the proximal end portion 126c of the rearward portion 126b of the boot 126 as shown in FIG. 2 when the optical fiber cable 106 is subjected to a downward load, such as a pull by a hand, in a maintenance and inspection operation. The bend is concentrated on the proximal portion 126c on the cantilever principle, because the rearward portion 126b itself is too flexible, has a small diameter, is long, and has a relatively small variation of thickness. Under a downward load of the optical fiber cable 106 of above about 0.3 kgf, the rearward portion 126c cannot prevent the acute bend of the optical fiber cable 106. Therefore, the transmission loss of the optical fiber cable 106 increases. As described above, a problem of the conventional optical connector plug is that its structure is not optimum to allow the optical fiber to bend at blunt angles which suppresses increases of its transmission loss.

SUMMARY OF THE INVENTION

An object of the present invention is to provide a strain relief boot for an optical connector plug which can prevent the occurrence of acute bends of the connection between the optical connector plug and an optical fiber cable, whereby the deterioration of the transmission characteristic of the optical fiber cable can be prevented.

The foregoing object is accomplished by a strain relief boot for an optical connector plug comprising: a first tubular member of an elastomeric material to be connected to an end portion of the optical connector plug, the first member adapted to surround a portion of an optical fiber cable connected to the optical connector plug, the portion being adjacent to the end portion of the optical connector plug; and a second tubular member of another elastomeric material connected coaxially with the first member, the second member adapted to surround another portion of the optical fiber cable which is continuous to the portion of the optical fiber cable, a hardness of the elastomeric material of the second member being lower than that of the elastomeric material of the first member.

In one embodiment, an outer diameter of the second member is gradually reduced away from the first member, and an end portion of the second member opposite to the first member is shaped in a cylindrical portion a thickness of which is substantially constant. Preferably, the cylindrical portion has a length of above 4.0 mm. Also, the hardness of the elastomeric material of the first member is about 1.5 times that of the elastomeric material of the second member. Preferably, the elastomeric material of the first member is Nylon 6.6 having a Rockwell hardness of about 85 (ASTM D785, R scale), and the elastomeric material of the second member is thermoplastic polyurethane having a Rockwell hardness of about 45 (ASTM D785, R scale). Also, the present invention relates to an optical connector plug comprising: (a) a ferrule adapted to be connected to an end portion of an optical fiber conductor of an optical fiber cable; (b) a plug body for surrounding and supporting the ferrule; (c) stop means inserted in an end of the plug body for preventing the ferrule from coming off the plug body; (d) cable retention means engaged in the stop means for retaining the optical fiber cable; and (e) a strain relief boot connected to the cable retention means for protecting the optical fiber cable, the strain relief boot including: a first tubular member of an elastomeric material to be connected to the cable retention means, the first member adapted to surround a portion of the optical fiber cable adjacent to the cable retention means; and a second tubular member of another elastomeric material connected coaxially with the first member, the second member adapted to surround another portion of the optical fiber cable which is continuous to the portion of the optical fiber cable, a hardness of the elastomeric material of the second member being lower than that of the elastomeric material of the first member.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENTS

Figure 3:
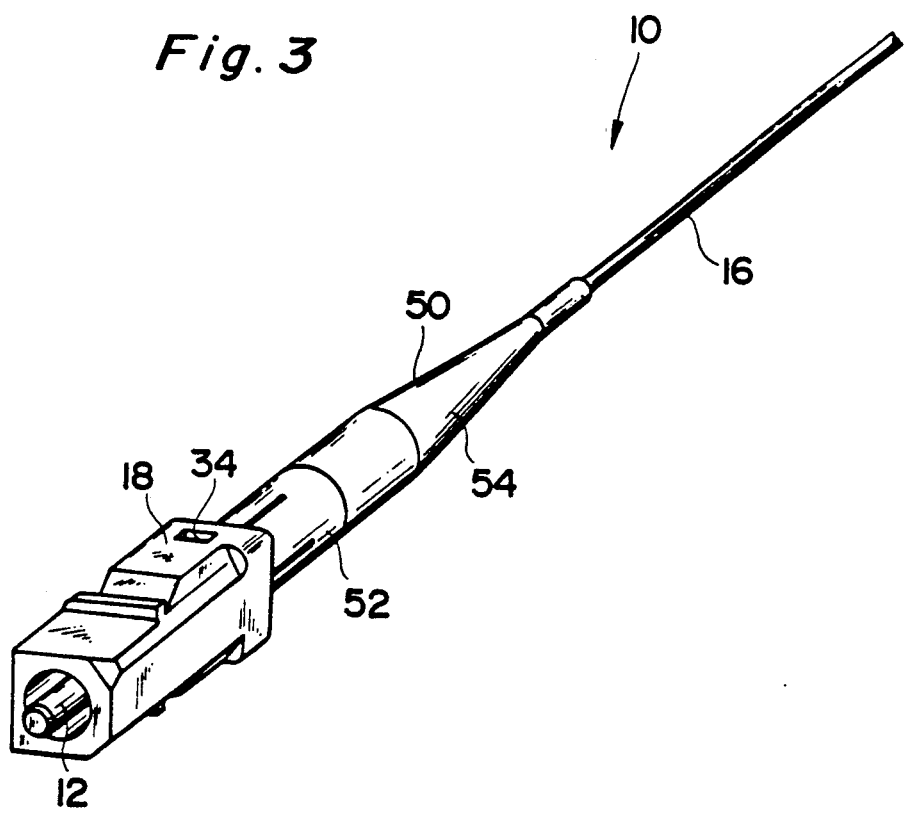
FIG. 3 is a perspective view of the optical connector plug according to the present invention.
Figure 4:
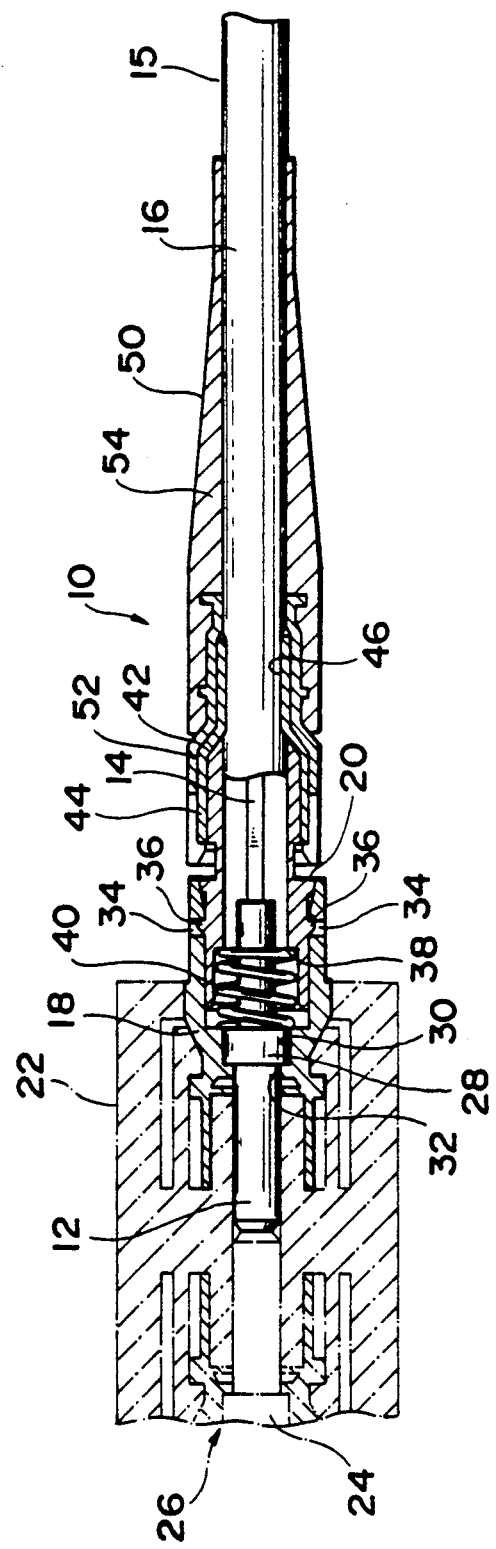
FIG. 4 is a sectional view of the optical connector plug of FIG. 3.

FIG. 3 is a perspective view of an optical connector plug according to the present invention. FIG. 4 is a longitudinal sectional view of the optical connector plug of FIG. 3. This optical connector plug 10 includes a ferrule 12 to be connected to one end portion of an optical fiber conductor 14 of a single mode type optical fiber cable 16, a plug body 18 for housing the ferrule 12, and a disengagement preventing ring or a stop ring 20 for preventing the ferrule 12 from coming off the plug body 18. The engagement of the plug body 18 into an alignment member 22 brings the ferrule 12 of the optical connector plug 10 into optical coupling with a ferrule 24 of another optical connector plug 26 engaged in the alignment member 22.

The ferrule 12 is substantially cylindrical and has an annular collar 28 formed on the outer circumferential surface of the middle portion thereof. This collar 28 is inserted axially slidably in a portion 30 (having substantially the same inner diameter as an outer diameter of the collar 28) formed on the inner circumferential surface of the plug body 18. The forward surface of the collar 28 abuts on the rear surface of a reduced diameter-portion 32 formed on the inner circumferential surface of the plug body 18, whereby the forward displacement (to the left in FIG. 7) of the ferrule 12 is restricted.

The stop ring 20 is inserted in the rear end portion of the plug body 18. A claw 36 formed on the side wall of the stop ring 20 is engaged into a perforation 34 formed in the side wall of the plug body 18 to secure the stop ring 20 to the plug body 18. A coil spring 40 is disposed between the forward surface of a step portion 38 formed on the inner circumferential surface of the stop ring 20 and the collar 28 of the ferrule 12 to urge the ferrule 12 forward.

The portion of the stop ring 20 projected rearward out of the plug body 18 is fixedly covered with a larger-diameter portion 44 of a cable retention ring 42. An inner diameter of a smaller-diameter portion of the cable retention ring 42 is substantially the same as an outer diameter of the optical fiber cable 16. The optical fiber cable 16 is extended outside through the smaller-diameter portion 46.

Figure 5:
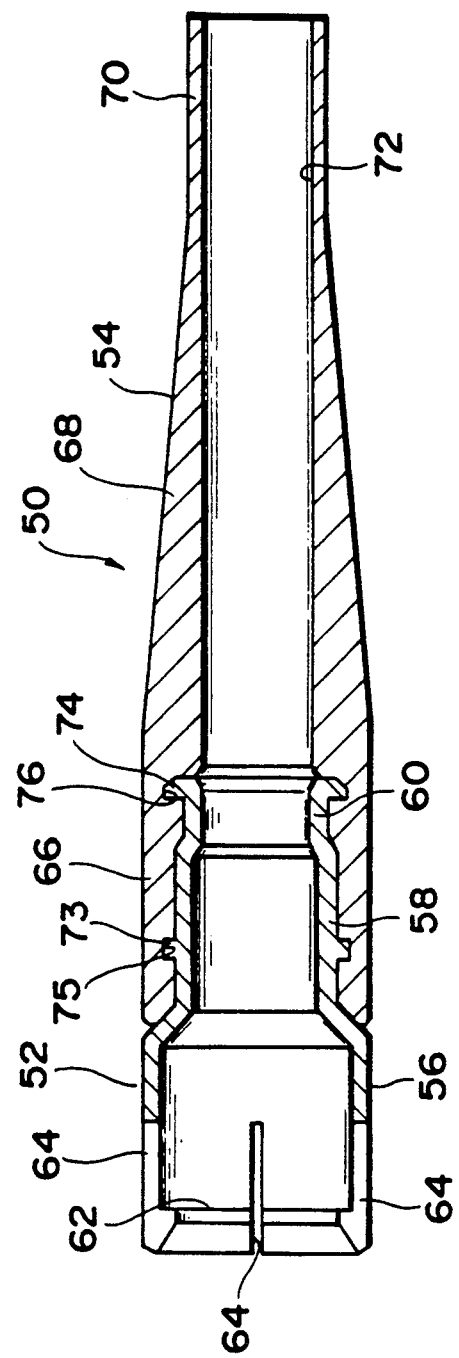
FIG. 5 is a sectional view of the strain relief boot according to the present invention for use in the optical connector plug of FIG. 3.

The optical connector plug 10 further includes a strain relief boot 50 according to the present invention. This boot 50 is mounted so as to cover the cable retention ring 42 and a portion of the optical fiber cable 16. As shown in FIG. 5, the boot 50 comprises a first tubular member 52 and a second tubular member 54 which is connected coaxially with the first member 52.

Figure 6:
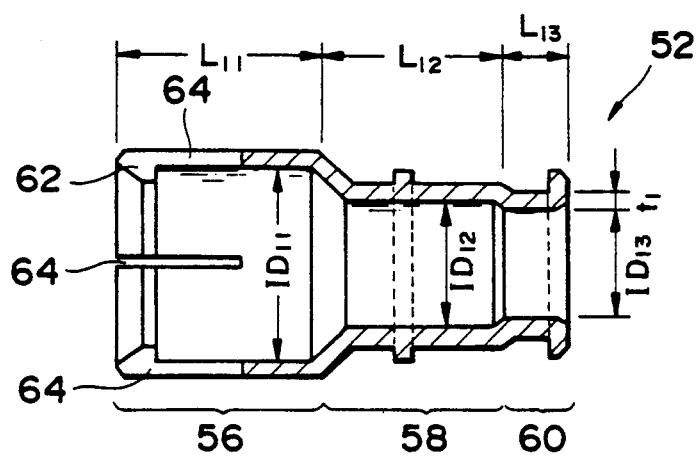
FIG. 6 is a sectional view of the first member of the boot of FIG. 5.

The first member 52 is formed of an elastomeric material of higher hardness, preferably Nylon 6.6 having an about 85 Rockwell hardness (ASTM D785, R scale). As shown in FIG. 6, the first member 52 includes a first substantially cylindrical portion 56 for covering the larger-diameter portion 44 of the cable retention ring 42, a second substantially cylindrical portion 58 for covering the smaller-diameter portion of the cable retention ring 42, and a third substantially cylindrical portion for covering a portion of the optical fiber cable 16 adjacent to the smaller-diameter portion 46 of the cable retention ring 42. The respective portions 56, 58, 60 have substantially the same thickness. An inward claw portion 62 is formed on the forward end of the first portion of the first member 56 for preventing the first portion 56 from coming off the cable retention ring 42 (see FIG. 4).

To facilitate fitting the stiff first member 52 on the cable retention ring 42, it is preferable to form a plurality of slits 64 (4 in the shown embodiment) axially in the first portion 58. In the case that the first member 52 is formed by injection molding, the slits 64 make it easy to release the first member 52 from a mold of an injection molding machine.

Figure 7:
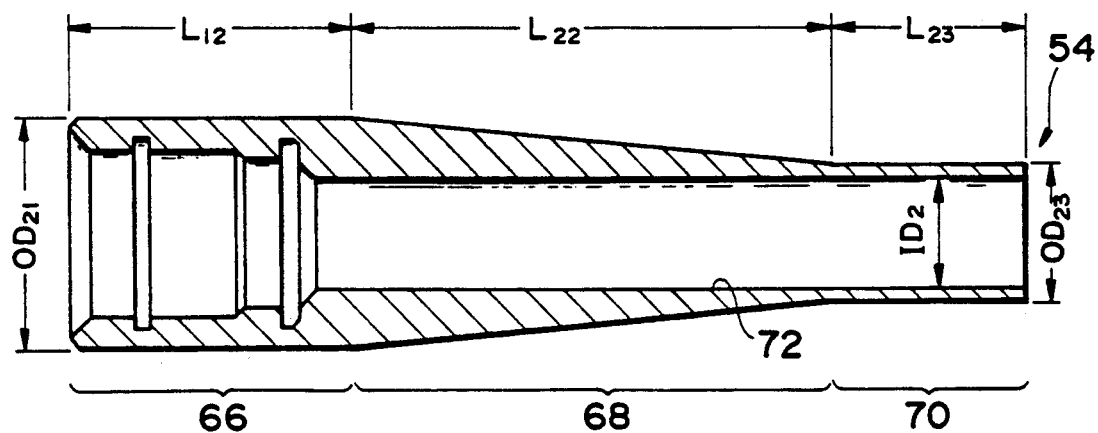
FIG. 7 is a sectional view of the second member of the boot of FIG. 5.

The second member 54 is formed of an elastomeric material of medium hardness, preferably thermoplastic polyurethane having a Rockwell hardness of about 45 (ASTM D785, R scale). As shown in FIGS. 5 and 7, the second member 54 includes a first substantially cylindrical portion 66 for contiguously surrounding the second and the third portions 58, 60 of the first member 52, a second substantially conical portion 68 extended rearward (to the right in FIG. 7) from the first portion 66, and a third substantially cylindrical portion 70 extended rearward from the second portion 68. The first portion 66 has substantially the same outer diameter as the first portion 56 of the first member 52, and an outer diameter of the third portion 70 is smaller than the first portion 66. Accordingly an outer diameter of the second portion 68 of the second member 54 is gradually reduced rearward. An inner diameter of the central hollow 72 extended through the centers of the second and the third portions 58, 70 is substantially the same as an outer diameter of the optical fiber cable 16 so that the inner diameter is in contact with the optical fiber cable 16.

Annular projections 73, 74 are formed respectively on the outer circumferential surface of the second portion 58 of the first member 52 and on the end of the third portion 60. These annular projections 73, 74 are engaged in annular grooves 75, 76 formed in the inner circumferential surface of the first portion 66 of the second member 54, whereby the second member 54 is secured to the first member 52. The first and the second member 52, 54 may be secured to each other by adhesives.

Returning to FIG. 4, the single mode type optical fiber cable 16 comprises an optical fiber conductor 14, and a jacket 15 surrounding the conductor 14. For example, in the case that the optical fiber cable 16 has an outer diameter of about 3.1 mm, optimum sizes of the first and the second members 52, 54 are as follows.

In the first member 52, a length $L_{11}$ of the first portion 56 is about 7.2 mm; an inner diameter $ID_{11}$ of the first portion 56, about 5.5 mm; a length $L_{12}$ of the second portion 58, about 5.0 mm; an inner diameter $ID_{12}$ of the second portion 58, about 3.5 mm; a length $L_{13}$ of the third portion 60, about 1.6 mm; an inner diameter $ID_{13}$ of the third portion 60, about 3.2 mm; and a thickness $t_1$, about 0.7 mm.

In the second member 54, a length $L_{21}$ of the first portion 66 is about 7.8 mm; an outer diameter $OD_{21}$ of the first portion 66, about 6.2 mm; a length $L_{22}$ of the second portion 68, about 14.6 mm; a length $L_{23}$ of the third portion 70, about 4.6 mm; an outer diameter $OD_{23}$ of the third portion 70, about 3.9 mm; and inner diameters $ID_2$ of the second and the third portions, about 3.1 mm.

The strain relief boot 50 of the above-described structure has been invented based on the test results which will be explained below.

First of all, the inventors conducted tests on boots 200 of substantially the same structure as the conventional boot 126 each inserted in a stiff support member 202 with an optical fiber cable 204 inserted through the boot and the support member. Although not shown, one end of the optical fiber cable 204 was connected to a light source, and the other end of the optical fiber cable 204 was connected to a photometer. The boots 200 were formed of materials of different hardness. The materials of the boots 200 used in the tests, and the hardness of the materials are stated in the following table.

TABLE

|  | Material | Hardness | Tensile Strength (kg/cm$^2$) | Elongation (%) |
|---|---|---|---|---|
| Lower Hardness | Silicone Rubber | 55 (JIS Hardness) | 80 | 400 |
| Medium Hardness | Thermoplastic Polyurethane | 45 (Rockwell Hardness) about 100 (JIS Hardness) | 470 | 490 |
| Higher Hardness | Nylon 6.6 | 85 (Rockwell Hardness) | 800 | 5 |

In this table, JIS hardness means a hardness given by the Spring Hardness Test (A type) in accordance with JIS K6301. Rockwell hardness means a hardness given by the Rockwell Hardness Test (R scale) in accordance with ASTM D785.

Figure 1:
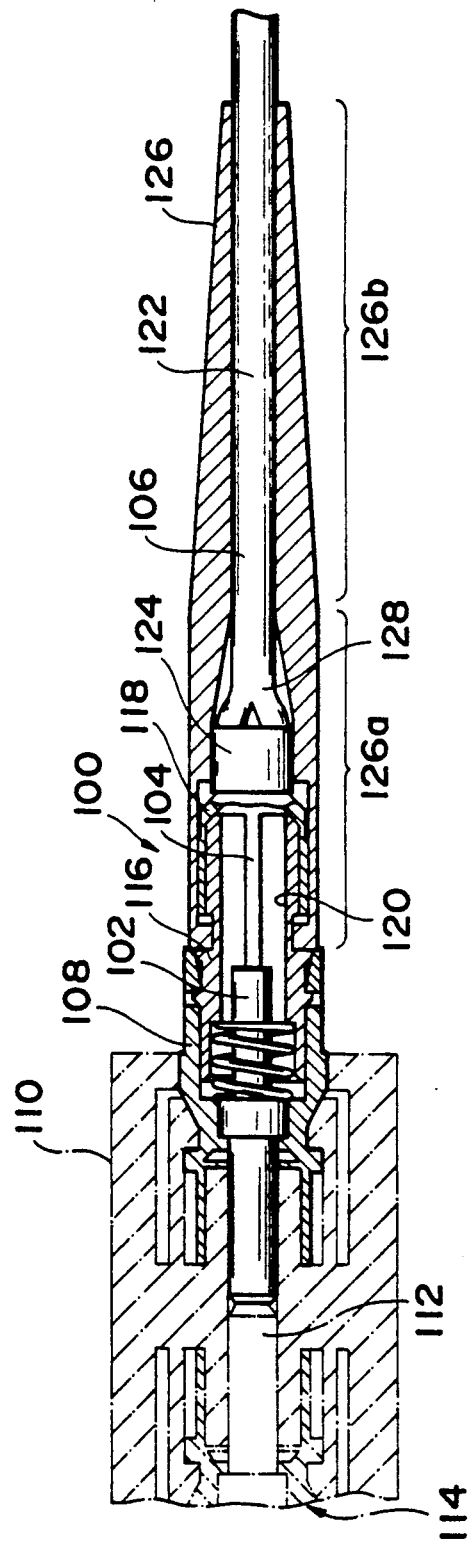
FIG. 1 is a sectional view of a conventional optical connector plug.
Figure 2:
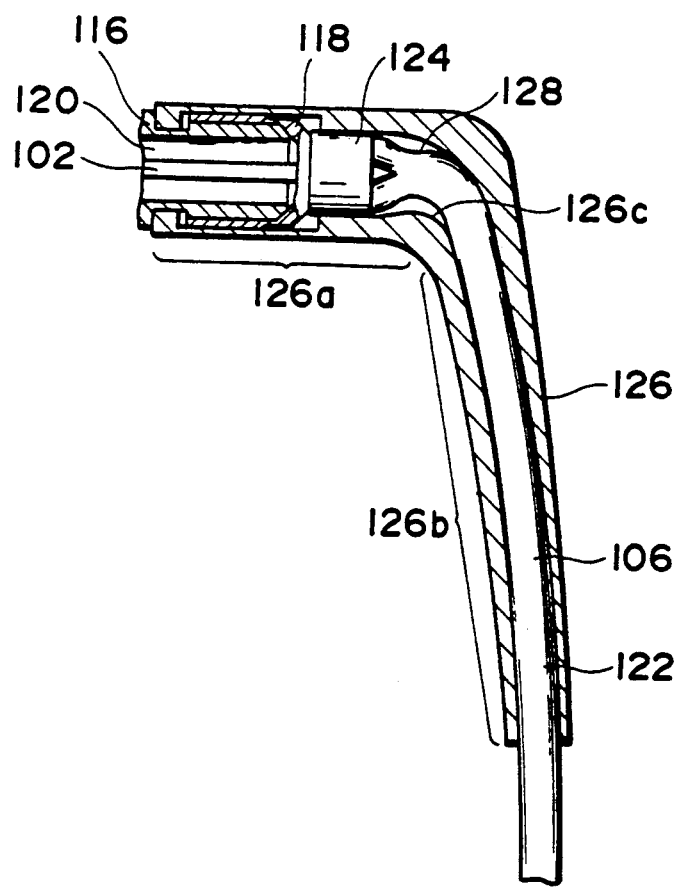
FIG. 2 is a sectional view of the strain relief boot of the conventional optical connector plug explaining the bend of the strain relief boot under a large load applied to the optical fiber cable.

In the tests, the support members 202 were secured to bases 206 so that the boots 200 were positioned horizontal. A 3.0 kgf downward load was applied to the respective boots at the position 208 of the optical fiber cables 204. Similarly, a 0.3 kgf downward load was applied to the optical fiber cables 204 of the respective boots 200. In FIG. 2, the lines (a) to (f) schematically indicate the bends of the boots 200 and the optical fiber cables 204 in the respective tests.

Figure 9:
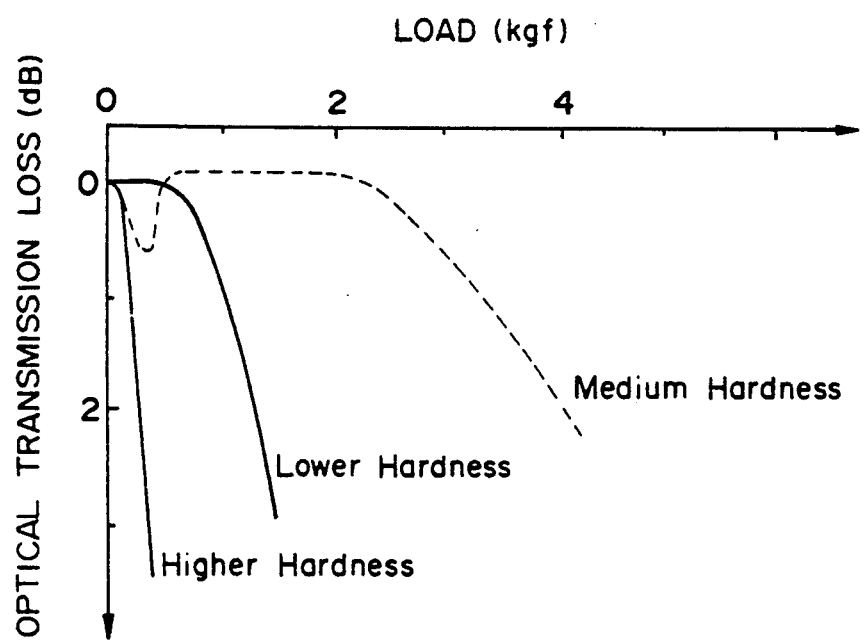
FIG. 9 is a graph of the relationship between the loads to the optical fiber cables and the optical transmission loss for the boots of the respective hardnesses of FIG. 8.

FIG. 9 shows the relationships between optical transmission losses and loads in the case that a load to the optical fiber cables 204 were changed gradually from 0 kgf to 4 kgf.

Figure 8:
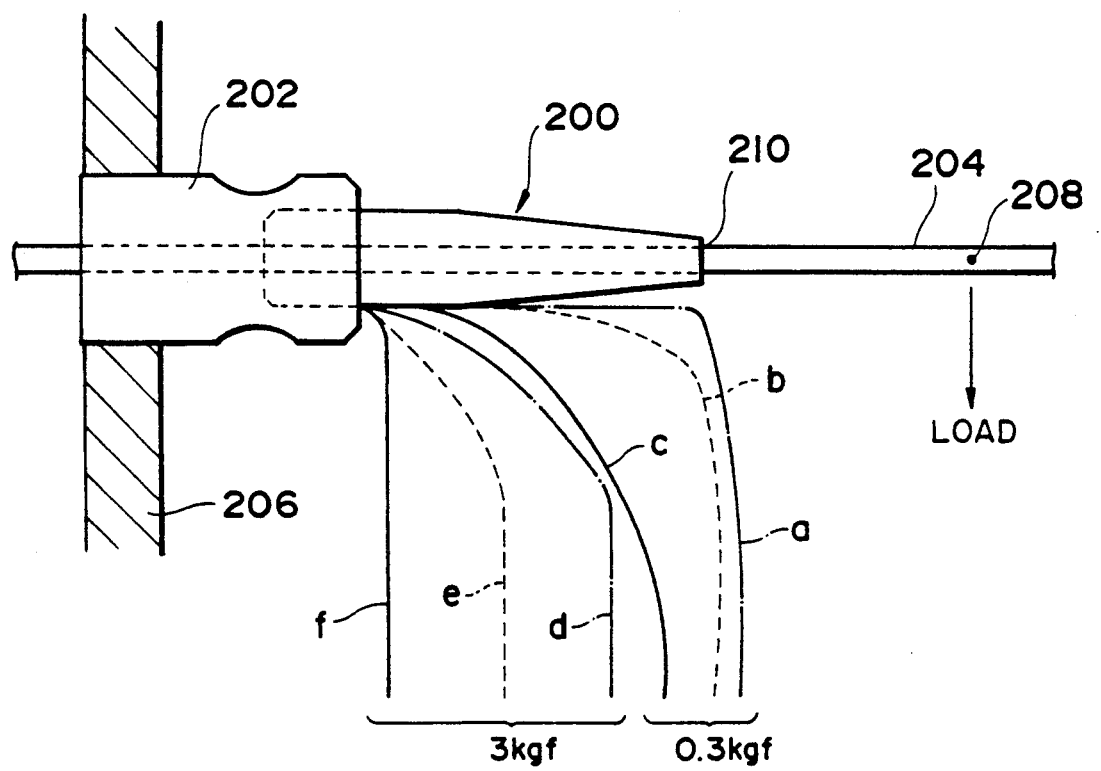
FIG. 8 is a schematic view of bends of a strain relief boot of the conventional general structure in accordance with a hardness of materials of the boot under different loads to the optical fiber cable.

As shown in FIG. 8, the bends subtlety differ depending on a material hardness of the optical fiber cable. It is understood in FIG. 9 that the optical transmission loss changes depending on bends of the boot 200. FIG. 8 shows that the boot of a hardness about twice that of the conventional silicone rubber boot is optimum. However, under a relatively low load (0.3 kgf), an acute bend occurs at the boundary between the boot 200 and the optical fiber cable 204, and an increase of the optical transmission loss is found (see the line (b) in FIG. 8). In the case that the boot 200 is made of a material of a further twice hardness, a more acute bend takes place at the boundary 210, and the optical transmission loss is more increased (see the line (e) in FIG. 8). Accordingly, it is confirmed that the boot with a hardness 1.5~3 times that of the conventional boot of a relatively soft material, such as silicone rubber, is effective.

Figure 10:
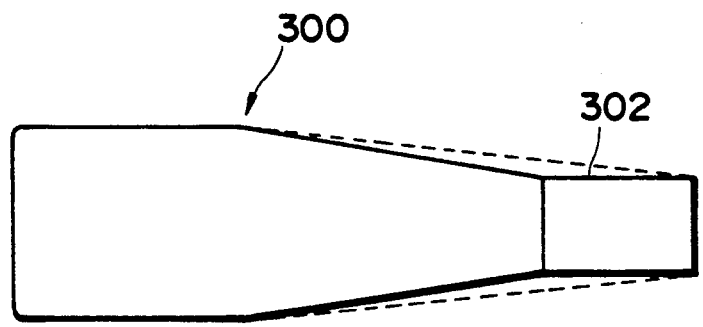
FIG. 10 is a side view of the boot having the cylindrical portion provided on the smaller-diameter end.
Figure 11:
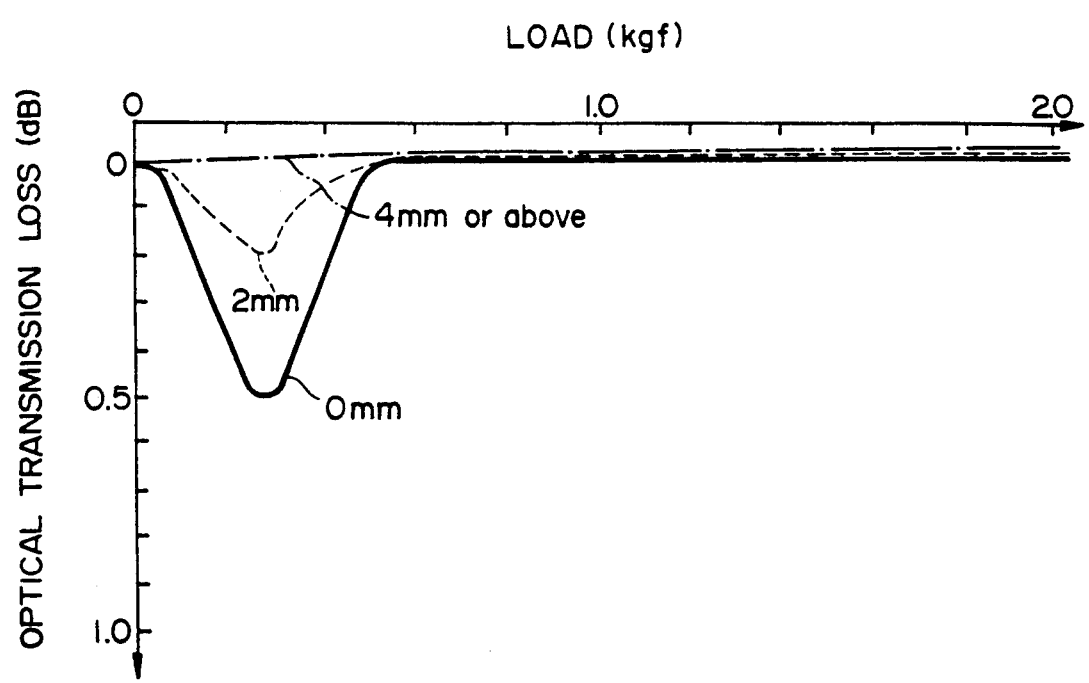
FIG. 11 is a graph of the relationship between loads to the optical fiber cables and the optical transmission loss for the boot of FIG. 10 with lengths of the cylindrical portion varied.

Next, the inventors studied in terms of structure the prevention of increases of the optical transmission loss under a relatively low load (0.3 kgf) to the boot of the above-described medium hardness material, and prepared the boot 300 of the structure as shown in FIG. 10. This boot 300 has a cylindrical portion 302 on the smaller-diameter end thereof, a thickness of the cylindrical portion 302 being substantially constant over a set length. In FIG. 10, the dot line indicates a shape of the conventional boot without the cylindrical portion. FIG. 11 shows the results of the same tests as in FIG. 8 conducted on four kinds of boots 300 with a 2 mm-length, a 4 mm-length, a 6 mm-length and an 8 mm-length cylindrical portions 302, and the boot 200 of FIG. 8. The boots 200 and the boots 300 used in these tests were made of thermoplastic polyurethane with a Rockwell hardness of 45.

As seen in FIG. 11, in the case that a load applied to the optical fiber cable is about 0.3 kgf, increases of the optical transmission loss are prevented by providing the cylindrical portion on the smaller-diameter end of the boot, and in the case that the cylindrical portion has a length above 4 mm, no optical transmission loss takes place. In these tests, the cylindrical portions were provided on the smaller-diameter ends within a total length (about 40 mm) of the conventional boot, but the same effect was produced by extending the cylindrical portions additionally from the smaller-diameter end of the conventional boot.

Figure 12:
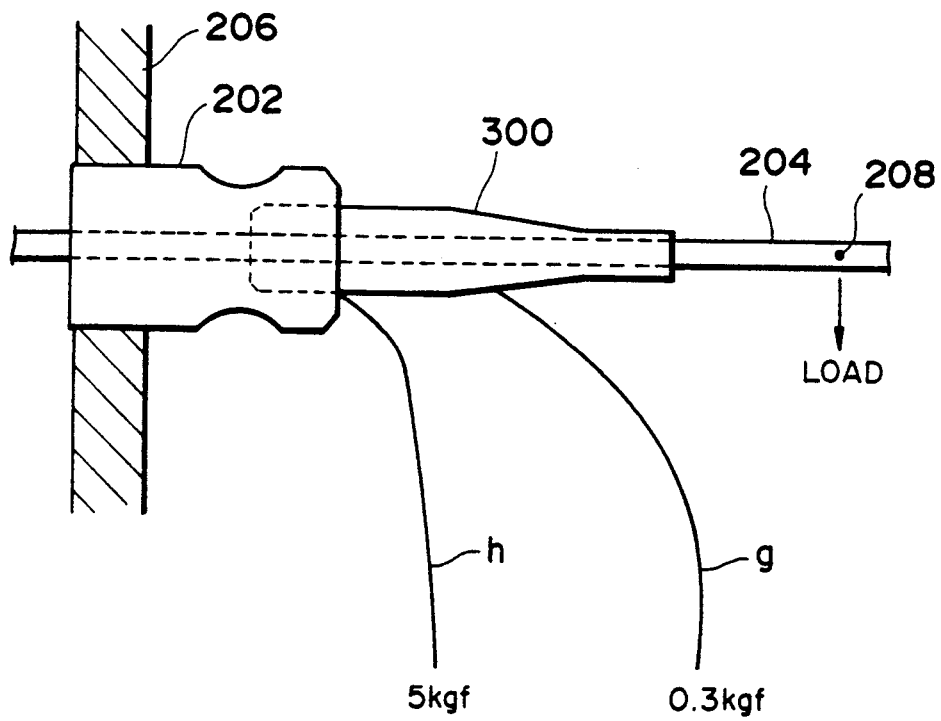
FIG. 12 is a schematic view of bends of the boot of FIG. under different loads to the optical fiber cables.

Further, the same test as in FIG. 8 was conducted on the boot 300 of a medium hardness with a 5 mm-length cylindrical portion, and a 0.3 kgf and a 5 kgf downward loads were applied to the optical fiber cable at certain points. FIG. 12 schematically shows the bends of the boot 300 and the optical fiber cable 204.

In FIG. 12, the line (g) shows that under a 0.3 kgf load, the boot 300 and the optical fiber cable 204 bluntly bent. Based on this bend, it was confirmed that increases of the optical transmission loss can be prevented, as described above.

Under a 0.5 kgf load, however, an acute bend occurred on the larger-diameter portion of the boot 300, i.e., the part of the boot 300 on the side of the support member 202, with the result of increases of the optical transmission loss (see the line (h) in FIG. 12).

Figure 13:
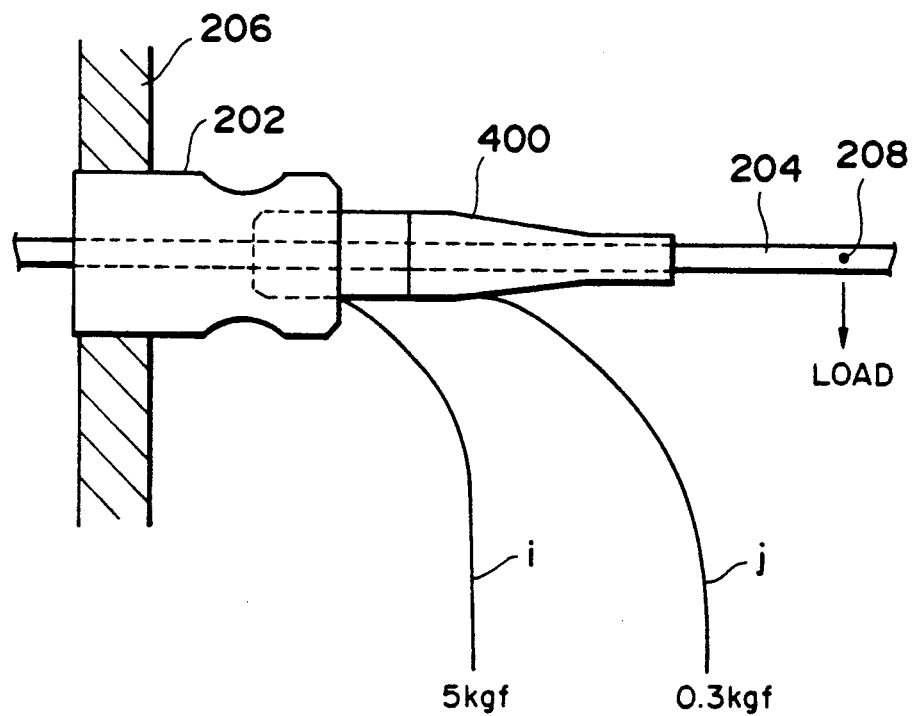
FIG. 13 is a schematic view of bends of the boot according to the present invention under different loads to the optical fiber cable.

An idea of the inventors for the prevention of an acute bend of the boot 300 under such a relatively high load to the optical fiber cable 204 with the result of suppressing increases of the optical transmission loss is to make the larger-diameter portion of the boot of a higher-hardness material. This idea is embodied by the two-piece boot 50 of FIGS. 3 and 4. FIG. 13 shows the result of the same test as in FIG. 12 conducted on substantially the same boot 400 as the boot 50 of FIGS. 3 and 4. As indicated by the line (i) of FIG. 13, even under a load of 5 kgf to the optical fiber cable 204, the boot bluntly bends. Under a load of 0.3 kgf, the boot 400 bluntly bends because of the cylindrical smaller-diameter end portion of the boot 400 (see the line (j)).

Figure 14:
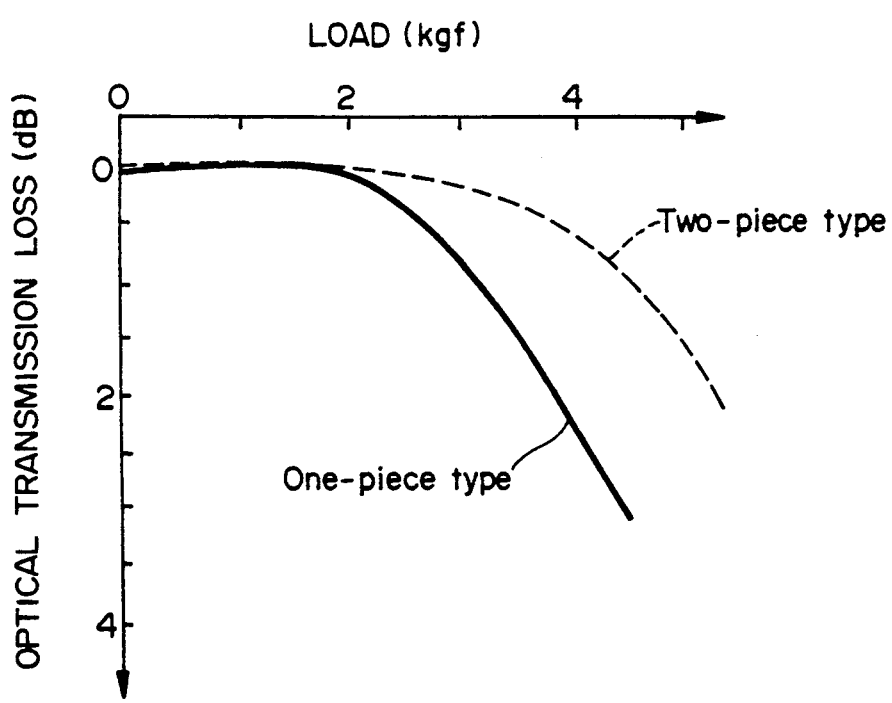
FIG. 14 is a graph of the relationship between loads to the optical fiber cables and optical transmission loss for the boots of FIGS. 12 and 13.

FIG. 14 is a graph of the relationship between loads and optical transmission loss for the one-piece boot made of a medium-hardness material alone, and the two-piece boot 400 according to the present invention used in the test of FIG. 13. This graph shows that the two-piece boot 400 according to the present invention has smaller optical transmission losses than the one-piece boot 300.

As seen from the above description, the optical connector plug using the strain relief boot according to the present invention prevents the boot and the optical fiber cable from bending at acute angles even under relatively large loads to the optical fiber cable connected to the optical connector plug, with the result that increases of the optical transmission loss are suppressed. Also, the provision of the thin cylindrical portion on the rear end of the boot prevents the optical fiber cable from bending at acute angles even under small loads to the optical fiber cable.

It will be appreciated that modifications may be made in the present invention. For example, it is possible to form the first member 52 and the second member 54 in one piece by injection molding or the like. The materials and sizes used in the present invention are not limited to the above-described ones and may be changed optionally in accordance with properties of optical fiber cables to be connected, weights of loads to be applied to the optical fiber cables, etc.

Such modifications are not to be regarded as a departure from the spirit and scope of the invention, and all such modifications as would be obvious to one skilled in the art are intended to be included within the scope of the following claims.

What is claimed is:

1. A strain relief boot for an optical connector plug, comprising:
    a first tubular member of an elastomeric material adapted to be connected to an end portion of said optical connector plug, said first member adapted to surround a portion of an optical fiber cable connected to said optical connector plug, said portion being adjacent to said end portion of said optical connector plug; and
    a second tubular member of another elastomeric material connected coaxially with said first member, said second member adapted to surround another portion of said optical fiber cable which is continuous to said portion of said optical fiber cable, a hardness of the elastomeric material of said second member being lower than that of the elastomeric material of said first member so as to reduce optical transmission loss upon bending of said optical fiber cable at said end portion of said connector plug when said boot is connected to said connector plug.

2. A strain relief boot for an optical connector plug according to claim 1, wherein an outer diameter of said second member is gradually reduced away from said first member, and an end portion of said second member opposite to said first member is shaped in a cylindrical portion a thickness of which is substantially constant.

3. A strain relief boot for an optical connector plug according to claim 2, wherein said cylindrical portion has a length of above 4.0 mm.

4. A strain relief boot for an optical connector plug according to claim 1, wherein said first member and said second member are formed in one piece.

5. An optical connector plug comprising:
    (a) a ferrule adapted to be connected to an end portion of an optical fiber conductor of an optical fiber cable;

(b) a plug body for surrounding and supporting said ferrule;

(c) stop means inserted in an end of said plug body for preventing said ferrule from coming off said plug body;

(d) cable retention means engaged in said stop means for retaining said optical fiber cable; and (e) a strain relief boot connected to said cable retention means for protecting said optical fiber cable, said strain relief boot including:

a first tubular member of an elastomeric material to be connected to said cable retention means, said first member adapted to surround a portion of said optical fiber cable adjacent to said cable retention means; and a second tubular member of another elastomeric material connected coaxially with said first member, said second member adapted to surround another portion of said optical fiber cable which is continuous to said portion of said optical fiber cable, a hardness of the elastomeric material of said second member being lower than that of the elastomeric material of said first member.

6. An optical connector plug according to claim 5, wherein an outer diameter of said second member is gradually reduced away from said first member, and an end portion of said second member opposite to said first member is shaped in a cylindrical portion a thickness of which is substantially constant 7. An optical connector plug according to claim 6, wherein said cylindrical portion has a length of above 4.0 mm.

8. An optical connector plug according to claim 5, wherein the hardness of the elastomeric material of said first member is about 1.5 times that of the elastomeric material of said second member.

9. An optical connector plug according to claim 5, wherein the elastomeric material of said first member is Nylon 6.6 having a Rockwell hardness of about 85 (ASTM D785, R scale), and the elastomeric material of said second member is thermoplastic polyurethane having a Rockwell hardness of about 45 (ASTM D785, R scale).

10. An optical connector plug according to claim 5, wherein said first member and said second member are formed in one piece.

11. A strain relief boot for an optical connector plug, comprising:

a first tubular member of an elastomeric material adapted to be connected to an end portion of said optical connector plug, said first member adapted to surround a portion of an optical fiber cable connected to said optical connector plug, said portion being adjacent to said end portion of said optical connector plug; and a second tubular member of another elastomeric material connected coaxially with said first member, said second member adapted to surround another portion of said optical fiber cable which is continuous to said portion of said optical fiber cable, a hardness of the elastomeric material of said second member being lower than that of the elastomeric material of said first member, said hardness of the elastomeric material of said first member being about 1.5 times that of the elastomeric material of said second member so as to reduce optical transmission loss upon bending of said optical fiber cable at said end portion of said connector plug when said boot is connected to said connector plug.

12. A strain relief boot for an optical connector plug, comprising:

a first tubular member of an elastomeric material adapted to be connected to an end portion of said optical connector plug, said first member adapted to surround a portion of an optical fiber cable connected to said optical connector plug, said portion being adjacent to said end portion of said optical connector plug; and a second tubular member of another elastomeric material connected coaxially with said first member, said second member adapted to surround another portion of said optical fiber cable which is continuous to said portion of said optical fiber cable, a hardness of the elastomeric material of said second member being lower than that of the elastomeric material of said first member, the elastomeric material of said first member being Nylon 6.6 having a Rockwell hardness of about 85 (ASTM D785, R scale), and the elastomeric material of said second member being thermoplastic polyurethane having a Rockwell hardness of about 45 (ASTM D785, R scale).

* * * * *